(12) United States Patent
Shin et al.

(10) Patent No.: US 9,008,504 B2
(45) Date of Patent: Apr. 14, 2015

(54) TRANSMISSION APPARATUS AND METHOD FOR SERIAL AND PARALLEL CHANNEL INTERWORKING IN OPTICAL TRANSPORT NETWORK

(75) Inventors: Jong-Yoon Shin, Daejeon-si (KR); Jong-Ho Kim, Daejeon-si (KR); Ji-Wook Youn, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 342 days.

(21) Appl. No.: 13/467,483

(22) Filed: May 9, 2012

(65) Prior Publication Data

US 2012/0288277 A1    Nov. 15, 2012

(30) Foreign Application Priority Data

May 9, 2011  (KR) .................. 10-2011-0043557
Apr. 27, 2012  (KR) .................. 10-2012-0044924

(51) Int. Cl.
*H04J 3/14* (2006.01)
*H04L 25/14* (2006.01)
*H04J 3/16* (2006.01)
*H04J 3/04* (2006.01)
*H04J 3/06* (2006.01)

(52) U.S. Cl.
CPC .................. *H04J 3/14* (2013.01); *H04J 3/1664* (2013.01); *H04J 3/047* (2013.01); *H04J 3/0608* (2013.01); *H04J 2203/006* (2013.01); *H04L 25/14* (2013.01)

(58) Field of Classification Search
CPC ......... H04J 3/14; H04J 3/1652; H04J 3/1658; H04J 3/1664; H04J 3/167
USPC ........................................................... 398/25
See application file for complete search history.

(56) References Cited

U.S. PATENT DOCUMENTS

| | | | |
|---|---|---|---|
| 7,394,985 B1* | 7/2008 | Wang et al. ..................... | 398/75 |
| 2003/0058505 A1* | 3/2003 | Arol et al. ..................... | 359/168 |
| 2009/0147896 A1* | 6/2009 | Frankel et al. ................ | 375/354 |
| 2010/0215060 A1 | 8/2010 | Haas | |

\* cited by examiner

*Primary Examiner* — Leslie Pascal
(74) *Attorney, Agent, or Firm* — Nelson Mullins Riley & Scarborough LLP; Anthony A. Laurentano, Esq.; Lewis Lee, Esq.

(57) ABSTRACT

A transmission apparatus and method for serial and parallel channel interworking in an optical transport network are provided. The transmission apparatus for serial and parallel channel interworking ensures interworking between parallel optical modules or between parallel and serial optical modules, regardless of a protocol, without having to add logics or with only a minimum number of logics, in order to manufacture a small-size optical module with low power consumption.

10 Claims, 14 Drawing Sheets

TRANSMISSION APPARATUS AND METHOD FOR SERIAL AND PARALLEL CHANNEL INTERWORKING IN OPTICAL TRANSPORT NETWORK

CROSS-REFERENCE TO RELATED APPLICATION

This application claims the benefit under 35 U.S.C. §119 (a) of Korean Patent Applications No. 10-2011-0043557, filed on May 9, 2011, and No. 10-2012-0044924, filed on Apr. 27, 2012, the entire disclosures of which are incorporated herein by reference for all purposes.

BACKGROUND

1. Field

The following description relates to a technique for optical transmission in an optical transport network, and more particularly, to a transmission technique for serial and parallel channel interworking to support signal comparability between serial and parallel channel signals in an optical transport network.

2. Description of the Related Art

ITU-T (International Telecommunications Union-Telecommunication) G.693 defines NRZ 10G and 40G optical signal specifications for communication between offices in a maximally 20 km radius. In particular, G.693 defines VSR2000-3R2 which is one of NRZ 40G optical signal specifications having a transmission distance of 2 km using a wavelength of 1550 nm. A 40G 300 pin Multi Source Agreement (MSA) optical module is used as a NRZ 40G serial optical module that satisfies a VSR2000-3R2 specification.

The 40G 300 pin MSA optical module defined in 40G 300 pin MSA uses SerDes Framer Interface (SFI)-5.1 as an OIF standard for connection to a framer or a Forward Error Correction (FEC) processor. The OIF SFI-5.1 defines a deskew channel for compensating for skews between 16 2.5G-level data signals, as well as compensating for the 16 2.5G-level data signals.

Meanwhile, the IEEE 802.3ba standard introduces a Multi-Lane Distribution (MLD) method to a Physical Coding Sublayer (PCS) so that a 40G Ethernet signal can be all transmitted through four, two or one physical lane, and also defines 40GBASE-LR4 PMD as a physical standard for transmitting 40G Ethernet signals. The 40GBASE-LR4 PMD uses, instead of transmitting a 40G Ethernet signal as a single serial optical signal, a method of assigning different Coarse Wavelength Division Multiplexing (CWDM) wavelengths to four 10G lanes and performing WDM.

As described above, the 40GBASE-LR4 PMD has an optical signal specification that is different from the VSR2000-3R2. In order to satisfy the 40GBASE-LR4 PMD optical specification, since a pluggable type of optical module whose specification is different from the VSR2000-3R2 is required due to the characteristics of the Ethernet, a 40G CFP optical module or a 40G Ethernet QSFP+ optical module that are different from the conventional 40G 300 pin MSA optical module have been released.

However, in order for the 40G-level optical module to have price competitiveness and a large supply, like a 10G-level XFP optical module, it is important to standardize an optical module that can be used in all the 10G Ethernet, 10G SDH, and 10G OTN. Accordingly, the IEEE 802.3 configures an IEEE 802.3bg Task force to complete standardization of 40GBASE-FR PMD that is compatible with the VSR2000-3R2 being a NRZ serial 40G standard that was the existing optical signal specification for 40G SDH and 40G OTN.

An initially developed 40GBASE-FR PMD is expected to support comparability with the existing 40G 300 pin MSA optical module. Accordingly, equipment vendors use a 40G 300 pin MSA optical module to receive all 40G SDH, 40G OTN, and 40G Ethernet signals. However, with the progression of technology, a pluggable type of 40BASE-FR PMD optical module having a size smaller than a fixed type of 40G 300 pin MSA optical module and low power consumption is expected to be released in near future. Since the 40G Ethernet can connect optical modules to each other through four electrical signals using a PCS lane distribution method, it is not preferable to use a SFI-5.1 interface that increases power consumption and has a large volume, and it is efficient to configure an optical module with a 4:1 multiplexer and a 1:4 demultiplexer.

SUMMARY

The following description relates to a transmission apparatus and method for serial and parallel channel interworking to implement signal comparability between 40G SDH signals and 40G OTN signals regardless of a protocol without having to add logics or with only a minimum number of logics in order to manufacture a small-size optical module with low power consumption.

In one general aspect, there is provided a transmission apparatus for serial and parallel channel interworking, which supports signal comparability between a serial channel signal and a parallel channel signal in an optical transport network, the transmission apparatus including: a first interface unit including first receiving (RX) and transmitting (TX) interface units configured to operate in a serial interface TX mode for channel interworking transmission between serial optical modules supporting a SerDes Framer Interface (SFI) and to process data signals and deskew signals that are transmitted in a transmission order of frames; and a second interface unit including second RX and TX interface units configured to operate in a parallel interface TX mode and to process data signals that are transmitted through a plurality of data lanes for channel interworking transmission between the serial optical modules supporting the SFI or between parallel optical modules supporting no SFI.

In another general aspect, there is provided a transmission apparatus for serial and parallel channel interworking, which supports signal comparability between serial and parallel channel signals in an optical transport network, the transmission apparatus including a Receiving (RX) interface unit, wherein the RX interface unit comprises a plurality of OTU3 demultiplexing lane receivers configured to receive a plurality of lane data signals from a serial optical module which does not support the SFI and to detect an OTU3 demultiplexing pattern from the plurality of land data signals, if data signals transmitted from a serial optical module which supports the SFI are demultiplexed through the serial optical module which does not support the SFI for channel interworking between the serial optical module which supports the SFI and the serial optical module which does not support the SFI, a plurality of RX delay units configured to delay outputs of the data signals transmitted from the plurality of OUT3 demultiplexing lane receivers, and a lane alignment unit configured to align data signals according to the demultiplexing pattern detected by the plurality of OTU3 demultiplexing lane receivers.

In another general aspect, there is provided a transmission method for serial and parallel channel interworking of a transmission apparatus for serial and parallel channel interworking, the transmission apparatus supporting signal comparability between a serial channel signal and a parallel channel signal in an optical transport network, the transmission method including at least one operation of: processing data signals and deskew signals that are transmitted in a transmission order of frames, in a serial interface transmission mode, through a first interface unit including first transmitting and receiving interface units for channel interworking transmission between serial optical modules that support a SerDes Framer Interface (SFI); and processing data signals transmitted through a plurality of data lanes, in a parallel interface transmission mode, through a second interface unit including second transmission and reception interfaces for channel interworking transmission between the serial optical modules that do not support the SFI or between parallel optical modules that do not support the SFI.

In another general aspect, there is provided a transmission method for serial and parallel channel interworking of a transmission apparatus for serial and parallel channel interworking, the transmission apparatus supporting signal comparability between a serial channel signal and a parallel channel signal in an optical transport network, the transmission method including: if data signals transmitted from a serial optical module which supports a SerDes Framer Interface (SFI) are demultiplexed through a serial optical module which does not support the SFI for channel interworking between the serial optical module which supports the SFI and the serial optical module which does not support the SFI, receiving a plurality of lane data signals from the serial optical module that does not support the SFI, and detecting an OTU3 demultiplexing pattern from the plurality of lane data signals to compensate for receiving skews of the lane data signals; and aligning the plurality of data signals according to the demultiplexing pattern.

Other features and aspects will be apparent from the following detailed description, the drawings, and the claims.

Figure 1:
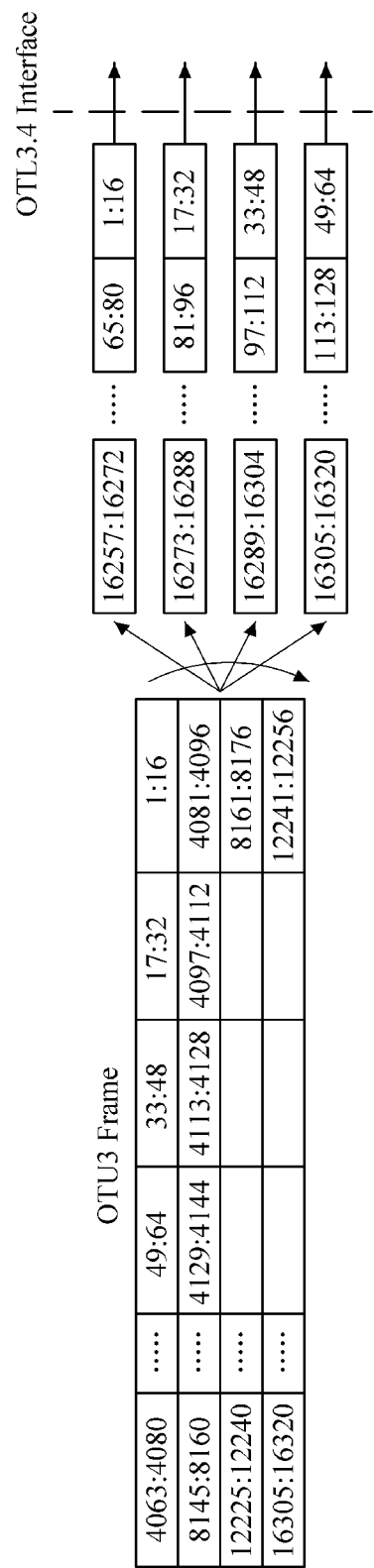
FIG. 1 is a view for explaining Multi-Lane Distribution (MLD).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a view for explaining Multi-Lane Distribution (MLD).

ITU-T applies MLD for transmitting OTU3 (Optical Transport Unit 3) signals through four physical lanes, to OTU3 frames, in order to transmit OTU3 signals that are one kind of 40G OTN (Optical Transport Network) signals using four CWDM wavelengths through a 40GBASE-LR4 optical module for Ethernet. FIG. 1 shows an example of transmitting a 40G OTU3 signal through 4-lane distribution. The OTU3 signal transmission through 4-lane distribution is referred to as OTL3.4 transmission.

Conventionally, a 40G 300 pin MSA optical module has been used to transmit OTU3 signals, and a 40GBASE-LR4 PMD optical module and a 40GBASE-FR PMD optical module that will be released in near future although their types have not yet been decided also will be able to be used to transmit OTU3 signals. The 40GBASE-FR PMD optical module, which is basically aimed at transmitting 40G Ethernet signals, may transmit OTU3 signals using an OTL3.4 transmission method which is a 4-lane distribution method as illustrated in FIG. 1. However, since the 40GBASE-FR PMD optical module does not support a conventional OTU3 transmission method of transmitting and receiving OTU3 frames in the order which they have been transmitted, the 40GBASE-FR PMD optical module cannot interwork with the 40G 300 pin MSA optical module although the same optical signal specification is used. Accordingly, the present invention has been proposed to solve a problem regarding interworking between the 40GBASE-FR PMD optical module which is a parallel optical module and the 40G 300 pin MSA optical module which is a serial optical module.

Figure 2A:
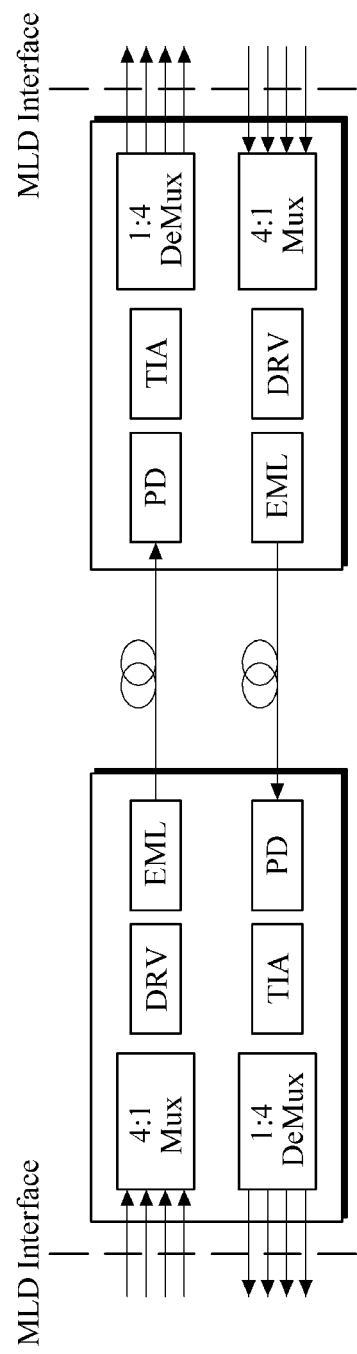
FIGS. 2A and 2B are views for explaining problems regarding interworking between optical modules.
Figure 2B:
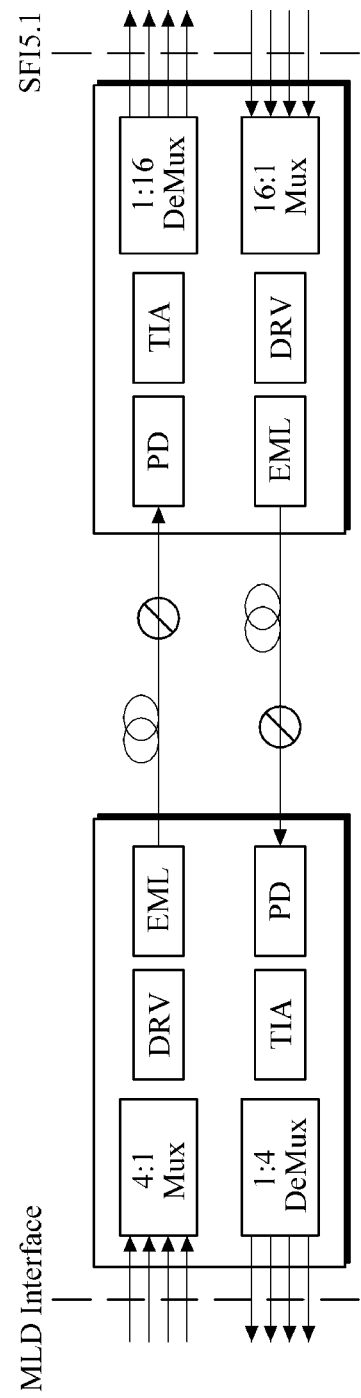

FIGS. 2A and 2B are views for explaining problems regarding interworking between optical modules.

FIG. 2A shows the case where two 40GBASE-FR PMD optical modules interface with each other. The 40GBASE-FR PMD optical modules interface with each other using the OTL3.4 transmission method. Since the 40GBASE-FR PMD optical module has a simple configuration consisting of a 4:1 multiplexer (MUX) and a 1:4 demultiplexer (DEMUX), skews are generated in four data lanes connected to a framer or a Forward Error Correction (FEC) processor, and accordingly, it is impossible to transmit OTU3 signals in the order which they have been transmitted. However, if both the 40GBASE-FR PMD optical modules use the OTL3.4 transmission method, the 40GBASE-FR PMD optical modules can communicate with each other without causing any problem. The OTL3.4 transmission method transmits OTU3 signals through 4-lane distribution, as described above with reference to FIG. 1.

FIG. 2B shows the case where a 40GBASE-FR PMD optical module interfaces with a 40G 300 pin MSA optical module. Generally, interfacing between a 40GBASE-FR PMD optical module and a 40G 300 pin MSA optical module is impossible. Even when an optical signal specification has been standardized such that a 40GBASE-FR PMD optical module can interwork with a 40G 300 pin MSA optical module, the 40GBASE-FR PMD optical module still has to use the OTL3.4 transmission method, and the 40G 300 pin MSA optical module has to use the OTU3 transmission method. The OTU3 transmission method transmits OTU3 signals in the order which they have been transmitted. For this reason, in spite of standardization of optical signal specification, the 40GBASE-FR PMD optical module cannot interwork with the 40G 300 pin MSA optical module. As such, 40G SDH and 40G OTN signals that can be transmitted through the 40G 300 pin MSA optical module interwork with the 40GBASE-FR optical module only on optical signal specification, not on protocol.

In order to overcome the problem, a method of enabling the 40G multiplexer and 40G demultiplexer of the 40GBASE-FR PMD optical module to convert the OTL3.4 transmission method into the OTU3 transmission method has been proposed. However, the method is protocol-dependent, and accordingly, a separate signal converter for transmitting 40G SDH signals is needed, which is a roadblock to fabrication of a small-size 40GBASE-FR PMD optical module with low power consumption.

In order to solve the problem, there are provided a transmission apparatus and method for serial and parallel channel interworking to implement signal comparability between 40G SDH signals and 40G OTN signals, regardless of a protocol, without having to add logics or with only a minimum number of logics, in order to manufacture a small-size optical module with low power consumption.

Figure 3:
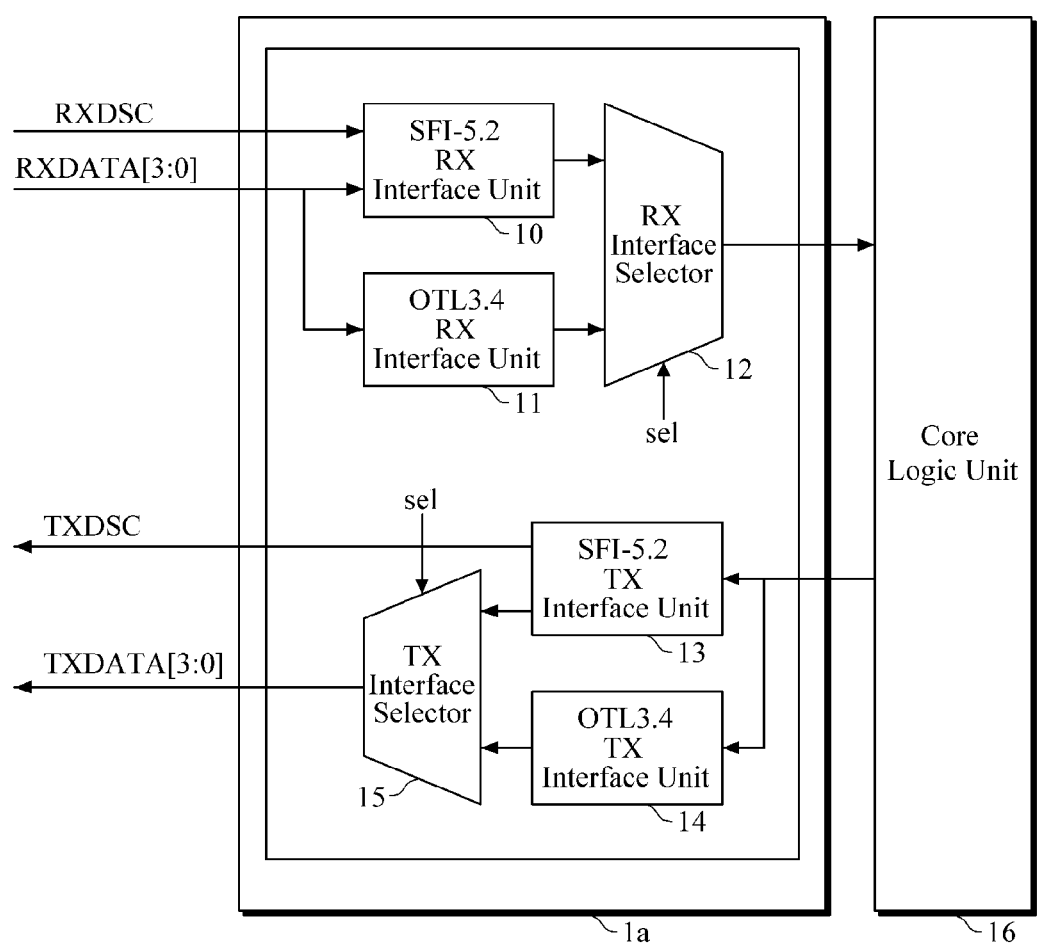
FIG. 3 is a diagram illustrating an example of a transmission apparatus for 40G serial and parallel channel interworking, which supports a SerDes Framer Interface (SFI)-5.2 interface.

FIG. 3 is a diagram illustrating an example of a transmission apparatus 1a for 40G serial and parallel channel interworking, which supports a SFI-5.2 interface.

Referring to FIG. 3, the transmission apparatus 1a includes a SFI-5.2 interface unit, an OTL3.4 interface unit, a receiving (RX) interface selector 12, and a transmitting (TX) interface selector 15.

The SFI-5.2 interface unit includes a SFI-5.2 RX interface unit 10 and a SFI-5.2 TX interface unit 13. The OTL3.4 interface unit includes an OTL3.4 RX interface unit 11 and an OTL3.4 TX interface unit 14.

The RX interface selector 12 selects one from an OTU3 frame signal output from the SFI-5.2 RX interface unit 10 and an OTU3 frame signal output from the OTL3.4 RX interface unit 11. The TX interface selector 15 selects one from an OTU3 frame signal output from the SFI-5.2 TX interface unit 13 and an OTL3.4 TX signal output from the OTL3.4 TX interface unit 14. Here, the OTU3 frame signal is a signal that is transmitted in the transmission order of OTU3 frames, and the OTL3.4 TX signal is a signal resulting from distributing OTU3 frames into four multi lanes.

A core logic unit 16 is used to process OTU3 signals. The transmission apparatus 1a receives OTU3 signals from the core logic unit 16 through the SFI-5.2 TX interface unit 13 and the OTL3.4 TX interface unit 14, and transmits OTU3 signals selected by the RX interface selector 12 to the core logic unit 16.

The transmission apparatus 1a may be a framer or a FEC processor. According to an example, a 40GBASE-FR PMD optical module may use a SFI-5.2 to interface with a 40G 300 pin MSA optical module. The SFI-5.2 which is an OIF standard enables a framer and SerDes to interface with four 10G data lanes, regardless of a protocol. For this, the OIF SFI-5.2 defines four 10G-level data signals, and additionally defines a deskew channel for compensating for skews between the four 10G-level data signals. That is, five physical lanes are needed, the multiplexer and demultiplexer of the optical module each needs an optical transceiver for receiving and transmitting deskew signals, and additionally, a logic for aligning the skews of data signals received through the deskew channel and a logic for generating a deskew channel from output data signals may be needed.

The configuration of the transmission apparatus 1a which is connected to the 40GBASE-FR PMD optical module supporting the SFI-5.2 interface is shown in FIG. 3.

In order to connect the 40GBASE-FR PMD optical module to the 40G 300 pin MSA optical module, the transmission apparatus 1a connects the 40GBASE-FR optical module to the 40G 300 pin MSA optical module in the transmission order of OTU3 frames through the SFI-5.2 interface, instead of outputting an OTL3.4 signal.

For example, if four 10G data signals are input to the 40GBASE-FR optical module supporting the SFI-5.2 interface, the 40GBASE-FR optical module uses the deskew channel to compensate for skews generated between four 10G data signals that are transmitted between the transmission apparatus 1a and the 40GBASE-FR optical module. Successively, the 40GBASE-FR optical module multiplexes the four 10G data signals to an optical signal through a 4:1 multiplexer and outputs the optical signal to the 40G 300 pin MSA optical module, thereby interworking with the 40G 300 pin MSA optical module.

The 40GBASE-FR optical module can perform the inverse operation in the same way. That is, if receiving a 40G serial channel signal from the 40G 300 pin MSA optical module in the transmission order of OTU3 frames, the 40GBASE-FR optical module demultiplexes the 40G serial channel signal into four 10G data signals through a 1:4 demultiplexer, adds a deskew channel signal to the four 10G data signals, and transfers the resultant signal to the transmission apparatus 1a. Then, the transmission apparatus 1a compensates for the skews of the four data signals received from the 40G 300 pin MSA optical module through the deskew channel so as to completely receive OTU3 frame signals, and accordingly, the transmission apparatus 1a can interwork with the 40G 300 pin MSA optical module.

Meanwhile, in order to connect the 40GBASE-FR PMD optical module supporting the SFI-5.2 interface to the 40G 300 pin MSA optical module, the transmission apparatus 1a has to operate, instead of by an OTL3.4 transmission method, by an OUT3 transmission method that receives and transmits OTU3 frame signals as they are. Meanwhile, in the case of connecting a 40GBASE-FR optical module to another 40GBASE-FR optical module, it is more efficient that a 40GBASE-FR optical module communicates with another 40GBASE-FR optical module using only four data signals, than using a SFI-5.2 interface by generating a separate deskew channel, since power consumption can be reduced. Also, since a pluggable type of 40GBASE-FR optical module does not support the SFI-5.2 interface, the pluggable-type of 40GBASE-FR optical module cannot transmit signals using the OUT3 transmission method. Accordingly, in the case of replacing a 40GBASE-FR optical module with a 40GBASE-LR4 optical module, OTL3.4 transmission has to be used.

Consequently, when a 40G 300 pin MSA optical module interfaces with a 40GBASE-FR optical module supporting a SFI-5.2 interface, the transmission apparatus 1a and the 40GBASE-FR optical module operate in a SFI-5.2 interface mode, and when a 40GBASE-FR optical module supporting a SFI-5.2 interface interfaces with another optical module that is different from a 40G 300 pin MSA optical module, the transmission apparatus 1a and the 40GBASE-FR optical module operate in the OTL3.4 transmission mode so that the transmission apparatus 1a and the 40GBASE-FR optical module use only a multiplex function and a demultiplex function.

However, it is inconvenient that what type of optical module of the other party is connected to a user has to be recognized and the transmission mode has to be manually converted according to the recognized optical module type of the other party although the 40GBASE-FR optical module supports the SFI-5.2 interface. That is, it is most efficient that if the other party's optical module is a 40GBASE-FR optical module, the transmission mode is converted into the OTL3.4 interface mode, if the other party's optical module is a 40G 300 PIN MSA optical module, the transmission mode is converted into the SFI-5.2 interface mode, and if the other party's optical module is a 40GBASE-LR4 optical module, the transmission mode is converted into the OTL3.4 interface mode. A transmission apparatus 1b for 40G serial and parallel channel interworking, which includes a component for overcoming the problem, will be described with reference to FIG. 4, below.

Figure 4:
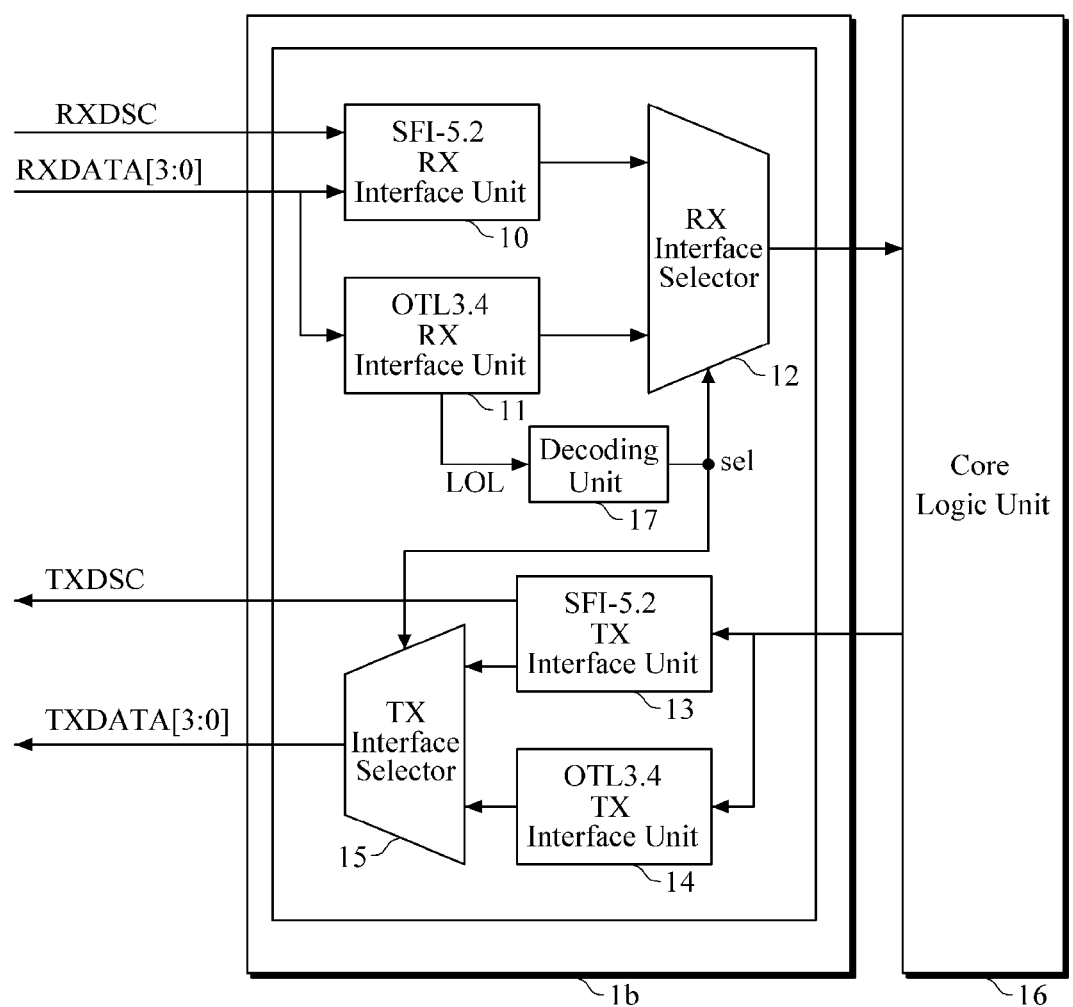
FIG. 4 is a diagram illustrating another example of a transmission apparatus for 40G serial and parallel channel interworking, which supports a SerDes Framer Interface (SFI)-5.2 interface.

FIG. 4 is a diagram illustrating another example of a transmission apparatus 1b for 40G serial and parallel channel interworking, which supports the SFI-5.2 interface.

Referring to FIG. 4, the transmission apparatus 1b further includes a decoding unit 17 in addition to the components of the transmission apparatus 1a shown in FIG. 3.

The decoding unit 17 decides a reception mode using a Loss of Lane Alignment (LOL) alarm signal indicating whether or not an OTL3.4 signal received through an OTL3.4 RX interface unit 11 has been normally aligned, and a RXOOA (RX Out-of-Alignment) alarm signal indicating whether or not a SFI-5.2 RX interface 10 has normally aligned a SFI-5.2 signal.

For example, if a LOL alarm signal is activated and a RXOOA alarm signal is deactivated, the decoding unit 17 determines that the SFI-5.2 RX interface unit 10 normally operates to enable a RX interface selector 12 to select data aligned by the SFI-5.2 RX interface unit 10. Also, the decoding unit 17 enables a transmission interface selector 15 to select a data signal output from a SFI-5.2 transmission interface unit 13 so that signals are transmitted through the SFI-5.2 transmission interface unit 13 instead of an OTL3.4 transmission interface unit 14. The SFI-5.2 transmission interface 13 outputs a deskew channel data signal.

Figure 5:
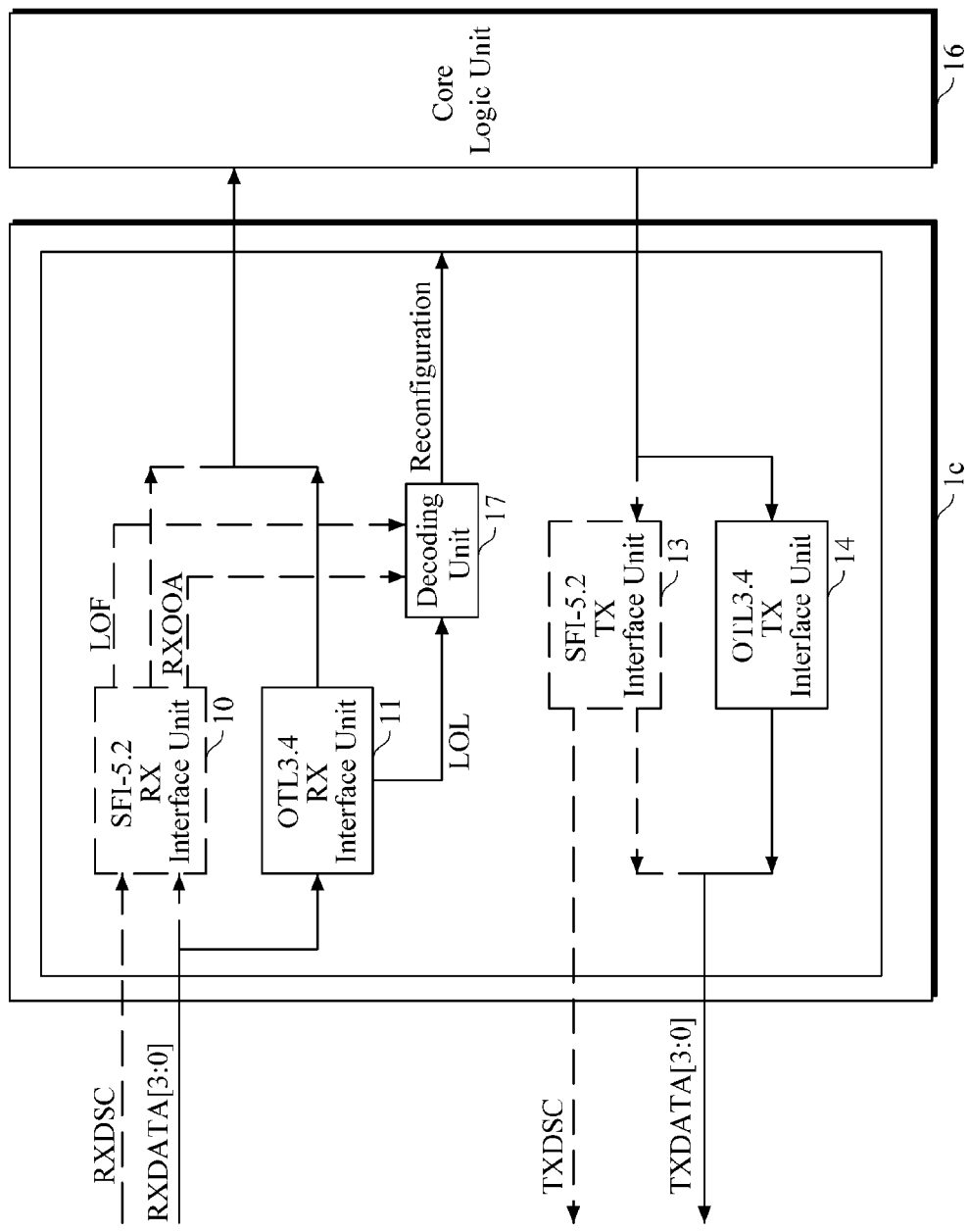
FIG. 5 is a diagram illustrating another example of a transmission apparatus for 40G serial and parallel channel interworking, which supports a SerDes Framer Interface (SFI)-5.2 interface.

FIG. 5 is a diagram illustrating another example of a transmission apparatus 1c for 40G serial and parallel channel interworking, which supports a SFI-5.2 interface.

Since the transmission apparatus 1c can operate through one of an OTL3.4 interface unit and a SFI-5.2 interface unit, it is inefficient to always operate both the OTL3.4 interface unit and the SFI-5.2 interface unit. The transmission apparatus 1c shown in FIG. 5 is an example designed to efficiently use power by improving inefficiency.

Referring to FIG. 5, according to an example, initially, OTL3.4 RX and TX interface units 11 and 14 are activated, and SFI-5.2 RX and TX interface units 10 and 13 are deactivated. If a decoding unit 17 receives a LOL alarm signal indicating that an OTL3.4 signal has not been normally aligned from an OTL RX interface unit 11, the decoding unit 17 activates the SFI-5.2 RX interface unit 10 or a RXDSC signal receiver included in the SFI-5.2 RX interface unit 10. If the SFI-5.2 RX interface unit 10 is activated, whether or not a SFI-5.2 signal has been normally aligned may be checked by receiving a RXOOA alarm signal. If no RXOOA alarm signal is received, the SFI-5.2 RX interface unit 10 may determine that a SFI-5.2 signal has been normally aligned, and accordingly the OTL3.4 RX interface unit 11 may be deactivated. Simultaneously, the OTL3.4 TX interface unit 14 is deactivated and the SFI-5.2 TX interface unit 13 is activated so that the transmission mode is converted into a SFI-5.2 interface mode, and accordingly, the transmission apparatus 1c can connect to the existing 40G 300 pin MSA optical module. At this time, if the component of the transmission apparatus 1c is implemented as ASIC, power consumption can be reduced by deactivating the corresponding logic. If the component is implemented as a Field Programmable Gate Array (FPGA), the corresponding logic may be reconfigured such that one logic of the OTL3.4 RX and TX interface units 11 and 14 and the SFI-5.2 RX and TX interface units 10 and 13 is activated.

Figure 6A:
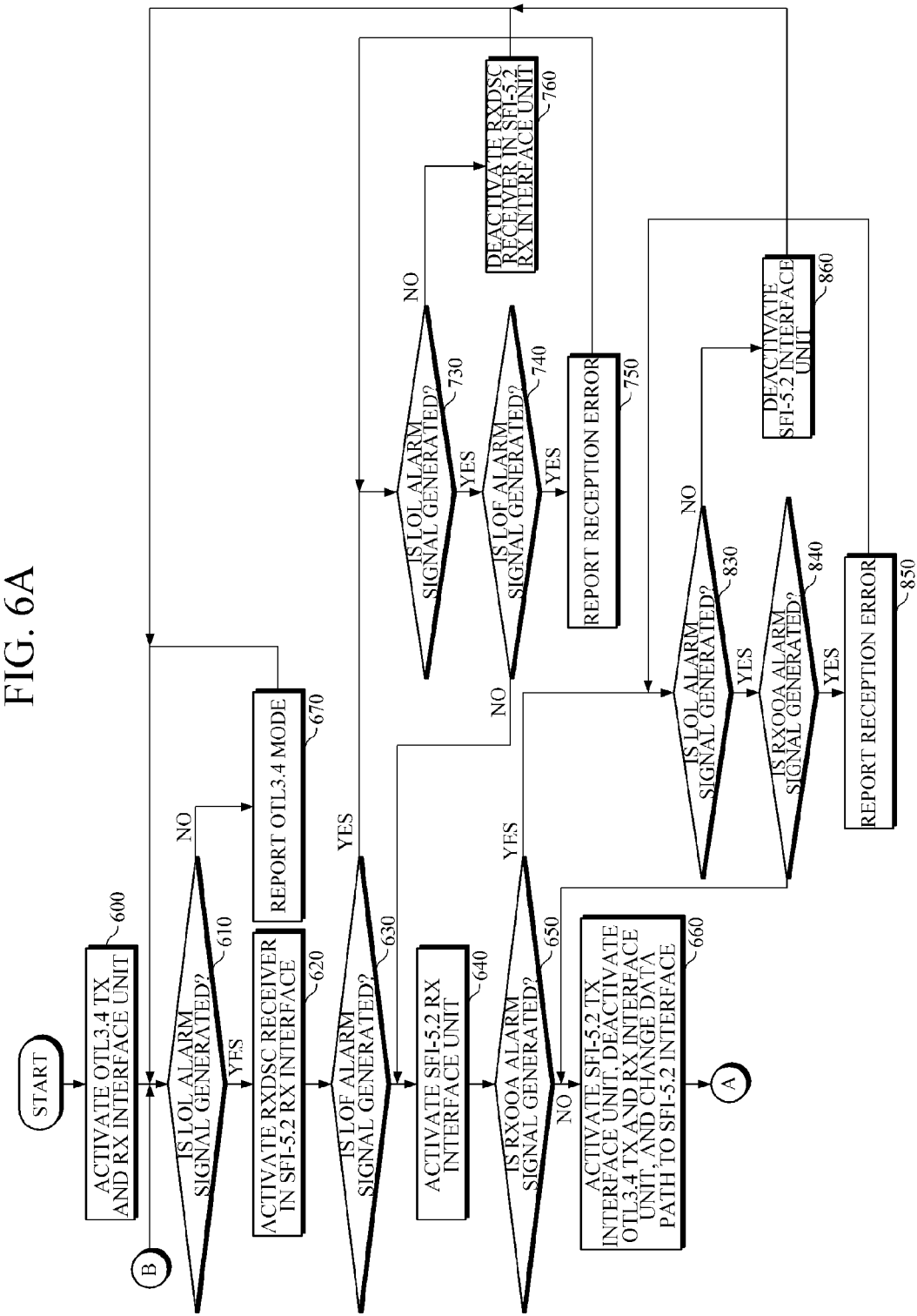
FIGS. 6A and 6B are flowcharts illustrating a method in which the transmission apparatus of FIG. 5 performs mode conversion between an OTL3.4 interface mode and a SFI-5.2 interface mode according to a type of a received signal.
Figure 6B:
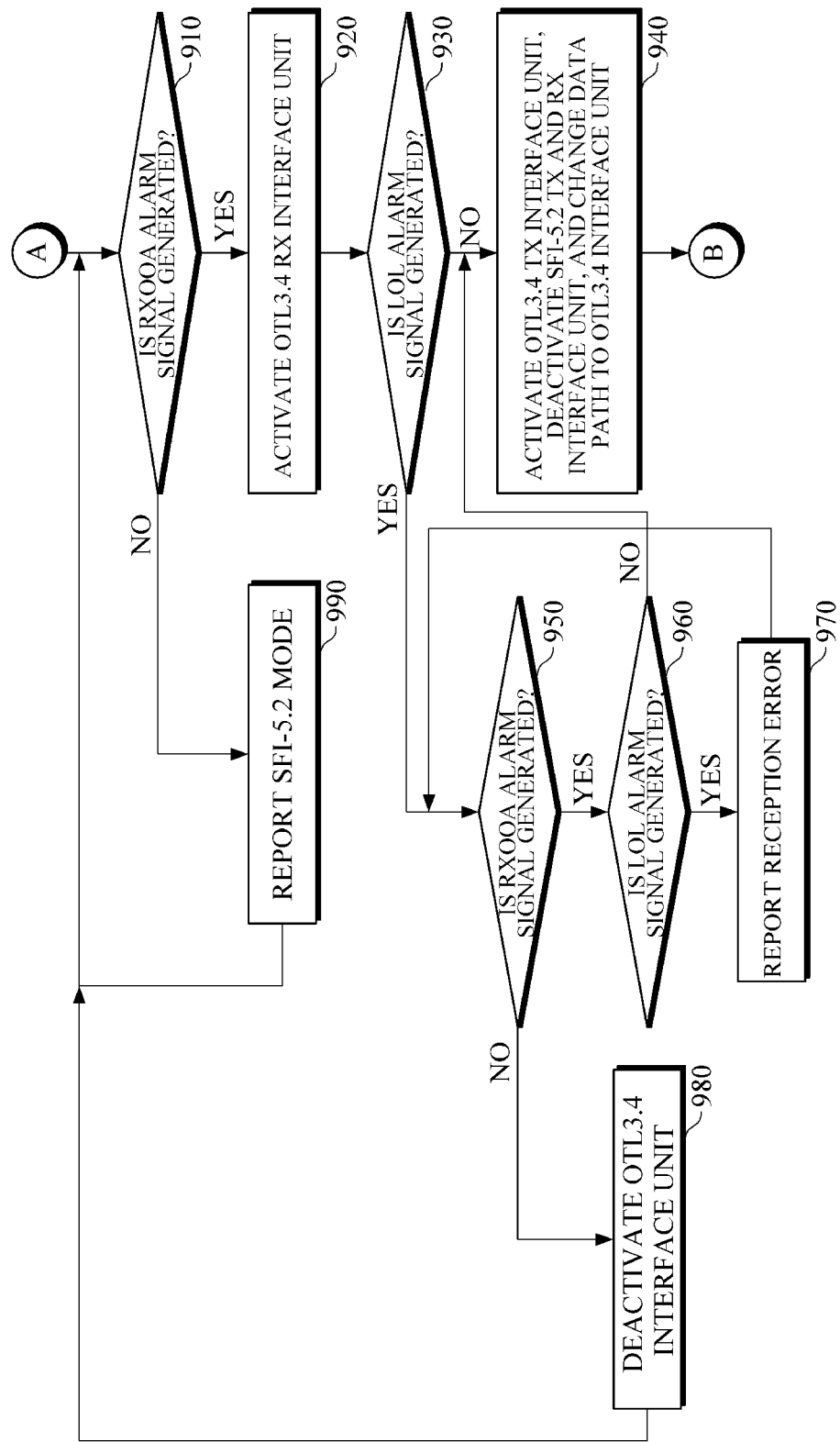

FIGS. 6A and 6B are flowcharts illustrating a method in which the transmission apparatus 1c of FIG. 5 performs mode conversion between an OTL3.4 interface mode and a SFI-5.2 interface mode according to a type of a received signal.

Referring to FIGS. 5, 6A, and 6B, the OTL3.4 RX and TX interface units 11 and 14 are first activated (600). Meanwhile, in order to first activate the SFI-5.2 RX and TX interface units 10 and 13, the process starts from operation B.

Successively, the decoding unit 17 of the transmission apparatus 1c determines whether a LOL alarm signal is output from the OTL3.4 RX interface unit 11 (610). If no LOL alarm signal is generated, the decoding unit 17 reports an OTL3.4 interface mode to the core logic unit 16 (670) and continues to determine whether a LOL alarm signal is generated. Meanwhile, if a LOL alarm signal is generated, the decoding unit 17 determines that OTL3.4 reception does not normally operate. Accordingly, the decoding unit 17 activates the SFI-5.2 RX interface unit 10, specifically, only a RXDSC receiver of the SFI-5.2 RX interface unit 10 as possible (620). In the current example, it is assumed that activating only the RXDSC receiver of the SFI-5.2 RX interface unit 10 is possible.

Successively, the decoding unit 17 determines whether a LOF alarm signal is output from the RXDSC receiver of the SFI-5.2 RX interface unit 10 (630). If no LOF alarm signal is generated, the decoding unit 17 determines that a RXDSC (reception deskew) signal is normally received, activates the SFI-5.2 RX interface unit 10, and determines whether an RXOOZ alarm signal is generated by the SFI-5.2 RX interface unit 10 (650). If no RXOOA alarm signal is generated, the decoding unit 17 determines that a SFI-5.2 RX interface signal is normally received, activates the SFI-5.2 TX interface unit 13 and deactivates the OTL3.4 RX and TX interface units 11 and 14 to thereby change data paths connected to the OTL3.4 RX and TX interface units 11 and 14 to the SFI-5.2 RX and TX interface units 10 and 13, respectively.

Meanwhile, if a LOF alarm signal is generated in operation 630, the decoding unit 17 determines that RXDSC reception does not normally operate and again checks a LOL alarm signal output from the OTL3.4 RX interface unit 11 (730). At this time, if no LOL alarm signal is generated, the decoding unit 17 deactivates the RXDSC receiver of the SFI-5.2 RX interface unit 10 (760). Meanwhile, if a LOL alarm signal is generated and no LOF alarm signal is generated, the decoding unit 17 activates the SFI-5.2 RX interface unit 10 (640). If both LOL and LOF alarm signals are generated, the decoding unit 17 reports a reception error state to the core logic unit 16 (750) and continues to determine whether LOL and LOF alarm signals are generated.

Meanwhile, if a RXOOA alarm signal is generated in operation 650, since it means that the SFI-5.2 RX interface unit 10 does not normally operate, the decoding unit 17 again checks a LOL alarm signal output from the OTL3.4 RX interface unit 11 (830). If no LOL alarm signal is generated, the decoding unit 17 deactivates the SFI-5.2 RX interface unit 10 (860). Meanwhile, if a LOL alarm signal is generated and no RXOOA alarm signal is generated in operation 840, the decoding unit 17 activates the SFI-5.2 RX interface unit 13 (660). If a LOL alarm signal is generated and a RXOOA alarm signal is generated in operation 840, the decoding unit 17 reports a reception error state (850) and continues to determine whether LOL and RXOOA alarm signals are generated.

Meanwhile, as shown in FIG. 6B, after operation 660, the decoding unit 17 determines whether a RXOOA alarm signal is generated (910). If no RXOOA alarm signal is generated, the decoding unit 17 reports a SFI-5.2 interface mode state (990) and continues to determine whether a RXOOA alarm signal is generated. Meanwhile, if a RXOOA alarm signal is generated, the decoding unit 17 determines that SFI-5.2 reception does not normally operate, activates the OTL3.4 RX interface unit 11 (920), and determines whether a LOL alarm signal is generated by the OTL3.4 RX interface unit 11 (930). Meanwhile, if no LOL alarm signal is generated, the decoding unit 17 determines whether signals are normally received from the OTL3.4 RX interface unit, activates the OTL3.4 TX interface unit 14 and deactivates the SFI-5.2 RX and TX interface units 10 and 13 to thereby change data paths connected to the SFI-5.2 RX and TX interface units 10 and 13 to the OTL3.4 RX and TX interface units 11 and 14, respectively (940). After operation 940, the decoding unit 17 continues to determine whether a LOL alarm signal is generated (610).

Meanwhile, if a LOL alarm signal is generated in operation 930, the decoding unit 17 determines whether a RXOOA alarm signal is generated by the SFI-5.2 RX interface unit 10 (950). At this time, if no RXOOA alarm signal is generated, the decoding unit 17 deactivates the OTL3.4 RX interface unit 11 (980). Meanwhile, if a LOL alarm signal is generated and no LOL alarm signal is generated in operation 960, the decoding unit 17 activates the OTL3.4 TX interface unit 14 (940). If a RXOOA alarm signal is generated and a LOL alarm signal is generated in operation 960, the decoding unit 17 reports a reception error state (970) and continues to determine whether RXOOA and LOL alarm signals are generated.

Various examples of a transmission apparatus and method for serial and parallel channel interworking to support signal comparability between serial and parallel channel optical modules using a 40GBASE-FR PMD optical module supporting a SFI-5.2 interface, have been described with reference to FIGS. 3 through 6B. However, 40G Ethernet signals can be transmitted, without having to use a SFI-5.2 interface, if the 40GBASE-FR optical module includes only a multiplexer and a demultiplexer. Accordingly, in order to miniaturize a 40GBASE-FR optical module and minimize power consumption, signal comparability between optical modules needs to be provided without having to support a SFI-5.2 interface.

Actually, CFP and QSFP+ types of 40GBASE-LR4 optical modules that transmit signals using four wavelengths have been released or are expected to be released, however, the CFP and QSFP+ optical modules do not support the SFI-5.2 interface. That is, even pins of a connector for the SFI-5.2 interface have not been defined, and the QSFP+ optical module includes no extra pins for defining such additional pins. Accordingly, when the 40GBASE-FR optical module which does not support the SFI-5.2 interface is used, comparability between the 40GBASE-FR optical module and a 40G 300 pin MSA optical module is not ensured. Before describing a configuration of the present invention for overcoming the problem, a connection structure between a 40GBASE-FR optical module and an OTL3.4 interface unit of a general transmission apparatus for serial and parallel channel interworking will be described.

Figure 7:
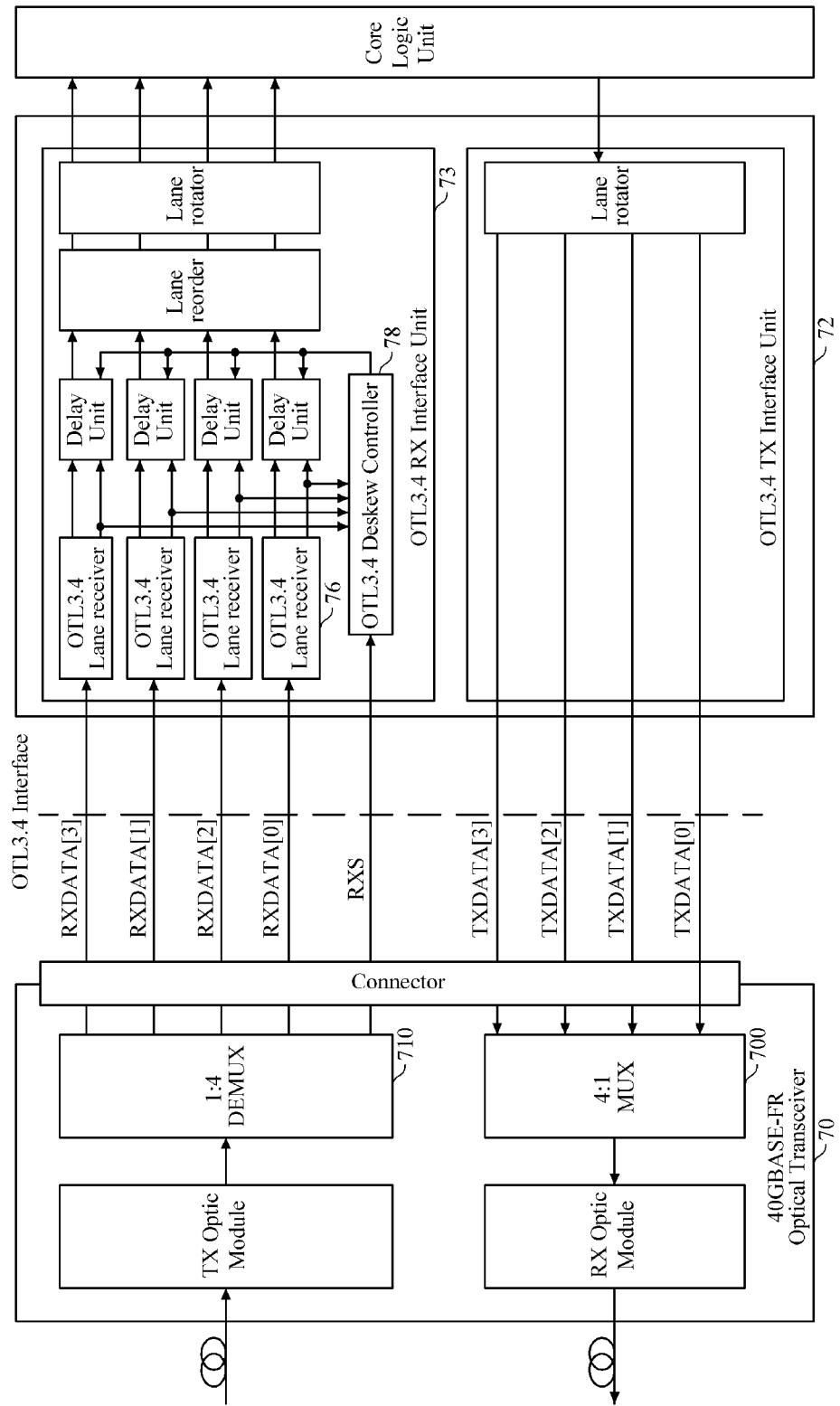
FIG. 7 is a diagram illustrating a 40G OTL3.4 RX interface of a general transmission apparatus for serial and parallel channel interworking that interfaces a 40GBASE-FR optical module.

FIG. 7 is a diagram illustrating a 40G OTL3.4 RX interface 11 of a general transmission apparatus 72 for serial and parallel channel interworking that interfaces a 40GBASE-FR optical module 70.

Signals that are input from a 40G 300 pin MSA optical module to the 40GBASE-FR optical module 70 are transmitted in the transmission order of OTU3 frames, and the 40GBASE-FR optical module 70 demultiplexes an OTU3 frame signal through a 1:4 demultiplexer 710 and transmits the resultant signal to the transmission apparatus 72. At this time, skews are generated in four RX data lanes, and skews also may be generated in OTL3.4 lane receivers 76 of the transmission apparatus 72 according to the reception characteristics of the OTL3.4 lane receivers 76 when the OTL3.4 lane receivers 76 receive data. The signals input to the OTL3.4 lane receivers 76 are not only OTL3.4 signals but also signals having skews, and if the OTL3.4 lane receivers 76 receive the signals, the OTL3.4 lane receivers 76 cannot detect a Frame Alignment Sequence (FAS) signal for each OTL3.4 lane. If such skews generated in the reception direction cannot be compensated for, the transmission apparatus 72 may not receive OTU3 signals normally.

Also, skews are generated from the OTL3.4 RX interface unit 73 to the 40GBASE-FR optical module 70 through four data lanes TXDATA[3:0], and skews may be generated when data signals are received through the four data lanes TXDATA [3:1] according to the characteristics of a 4:1 multiplexer (MUX) 700. If such skews generated in the transmission direction cannot be compensated for, the 40G 300 pin MSA optical module may not receive OTU3 signals normally.

As such, in order to maintain comparability with the 40G 300 pin MSA optical module, it is necessary to compensate for reception and transmission skews generated between the 40GBASE-FR optical module 70 and the transmission apparatus 72 for serial and parallel channel interworking and to realign the skew-compensated signals to OTN transmission signals.

In order to implement comparability with signals input to the transmission apparatus 72 from a 40G 300 pin MSA optical module through the 40GBASE-FR optical module 70, when OTU3 signals received serially are 1:4 demultiplexed, data signals output through four data lanes will be described with reference to FIG. 8.

Figure 8:
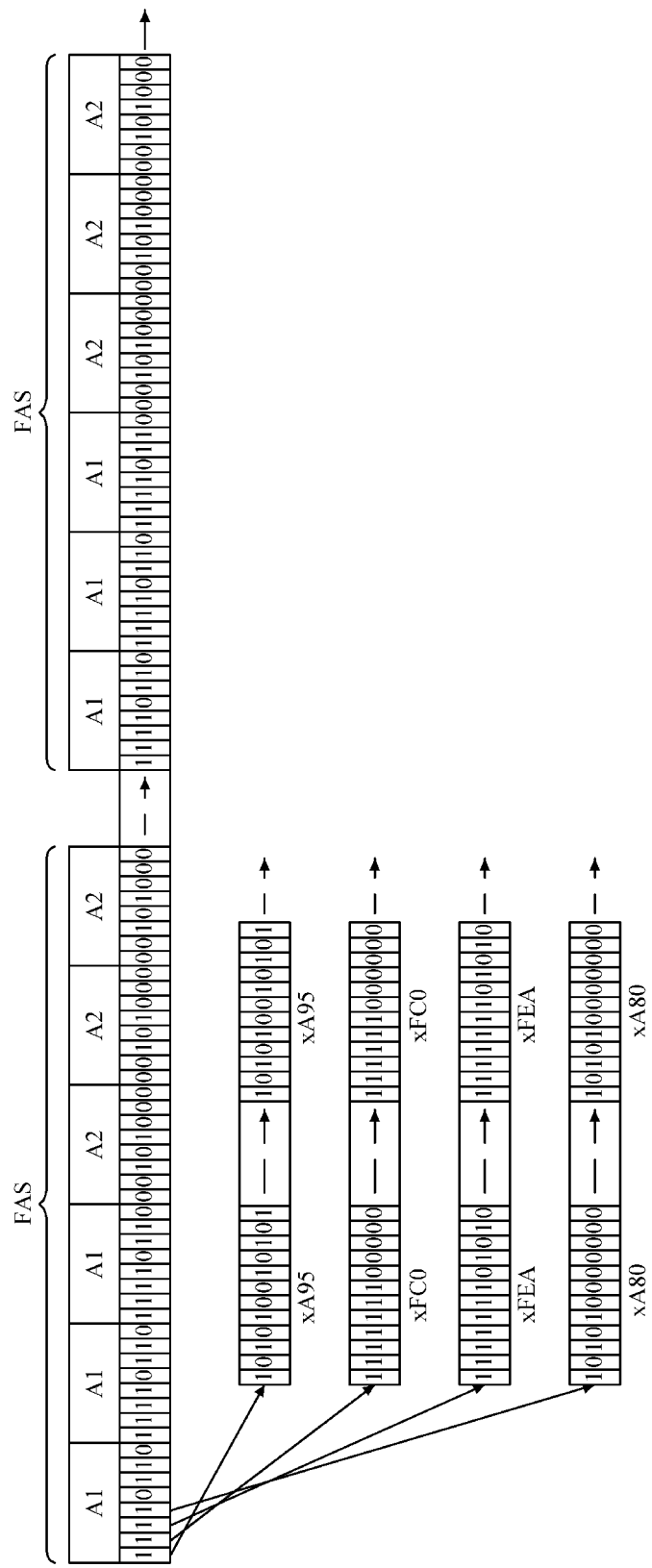
FIG. 8 shows four data signal streams that are generated by 1:4 demultiplexing of a serial OTU3 signal.

FIG. 8 shows four data signal streams that are generated by 1:4 demultiplexing of a serial OTU3 signal.

In drawings that will be described below, it is assumed that a 40GBASE-FR optical module includes no additional logic, such as a SFI-5.2 interface unit or an OTL3.4 interface unit, for compensating for skews of four data lanes or for generating a signal for compensating for the skews.

Referring to FIG. 8, if a 40G serial signal is input from a 40G 300 pin MSA optical module to a 40GBASE-FR optical module in the transmission order of OTU3 frames, the 40GBASE-FR optical module demultiplexes the 40G serial signal into four 10G signals through a 1:4 multiplexer. A frame alignment signal of an OTU3 frame has been defined as 6 bytes of A1A1A1A2A2A2 (A1=Xf6, A2=x28). Accordingly, if a frame alignment sequence is 1:4 demultiplexed, a specific pattern of 12 bits for each of the four data lanes is repeated per OTU3 frame period/4.

That is, according to an example, by adding a configuration for 1:4 demultiplexing pattern alignment as well as an OTL3.4 lane alignment unit to the transmission apparatus for serial and parallel channel interworking, it is possible to compensate for and align skews for each of the four data lanes so as to receive the OTU3 frame signal of the 40G 300 pin MSA optical module.

In detail, as shown in FIG. 8, the OTU3 frame signal is received from a 40G 300 pin MSA optical module to a 40GBASE-FR optical module in the transmission order of OTU3 frames. At this time, the 40GBASE-FR optical module performs 1:4 demultiplexing on the OTU3 frame signal to generate four lane data signals. xF6, xF6, xF6, x28, x28, and x28 signals which are the FASs of the OTU3 frame are received repeatedly for each OTU3 frame period. Four lane data signals are generated through a 1:4 demultiplexer, and skews are generated according to the characteristics of the 1:4 demultiplexer when the four lane data signals are output, so that the skews are generated between the four data lanes to the transmission apparatus for serial and parallel channel interworking. However, when signals received in the transmission order of OTU3 frames are 1:4 demultiplexed, different patterns of periodic signals are generated in the respective four data lanes. That is, as shown in FIG. 8, xA95 may be used as an alignment bit signal for a first lane of the OTU3 frame, xFC0 may be used as an alignment bit signal for a second lane of the OTU3 frame, xFEA may be used as an alignment bit signal for a third lane of the OTU3 frame, and xA800 may be used as an alignment bit signal for a four lane of the OUT3 frame. Accordingly, the current example uses an OTU3 demultiplexing lane receiver that detects OTU3 demultiplexing patterns xA95, xFCO$_3$ xFEA, and xA80, instead of a FAS pattern detector for each OTL3.4 lane. In this case, it is possible to measure skew values between the individual lanes and compensate the skews through alignment bit signals that are periodically repeated for the respective data lanes. Also, since the alignment bit signals are different for the respective data lanes, the lanes may be realigned according to detected alignment bit signals. Hereinafter, a transmission apparatus for 40G serial and parallel channel interworking, including an OTU3 demultiplexing lane receiver, will be described with reference to FIG. 9.

Figure 9:
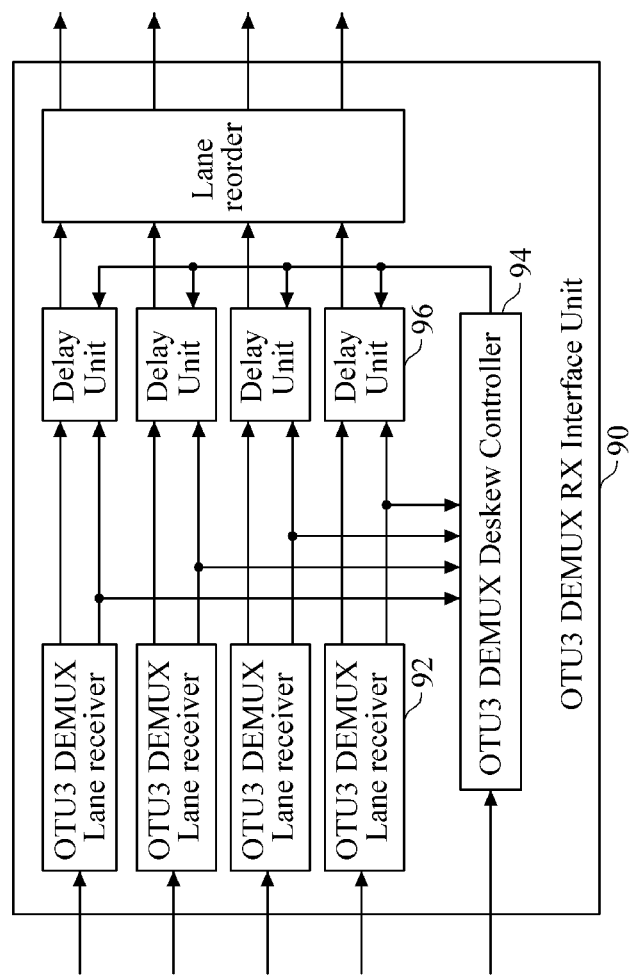
FIG. 9 is a diagram illustrating a configuration example of a receiver of a transmission apparatus for 40G serial and parallel channel interworking that does not support the SFI-5.2 interface.

FIG. 9 is a diagram illustrating a configuration example of a receiver of a transmission apparatus for 40G serial and parallel channel interworking that does not support the SFI-5.2 interface.

Referring to FIG. 9, the receiver of the transmission apparatus for 40G serial and parallel channel interworking configures an OTU3 DEMUX RX interface unit 90, instead of the OTL3.4 RX interface unit 73 of FIG. 7, in order to receive signals of a 40G 300 pin MSA optical module through a 40GBASE-FR optical module. The OTL3.4 lane receivers 76 of FIG. 7 detects a FAS pattern for each OTL3.4 lane and uses the detected FAS pattern to compensate for skews generated between the OTL3.4 lane and another OTL3.4 lane, whereas since OTU3 DEMUX lane receivers 92 of FIG. 9 can detect all OTU3 DEMUX patterns xA95, xFC0, xFEA, and xA80, the OTU3 DEMUX lane receivers 92 can detect all input patterns of xA95, xFC0, xFEA, and xA80. Also, the OTU3 DEMUX lane receivers 92 align data according to the detected pattern, and transfer a signal about a timing at which a pattern of each lane has been detected and about which pattern is the detected pattern to an OTU3 DEMUX Deskew controller 94. The OTU3 DEMUX Deskew controller 94 may generate timing signals for minimizing delays in data outputs of delay units 96, based on timings at which the patterns of the individual lanes have been detected, received from the individual OTU3 DEMUX lane receivers 92. Also, the OTU3 DEMUX Deskew controller 94 may decide an order of the lanes and realign the lanes according to the decided order based on information about which patterns are detected in the lanes. If the same pattern is detected in two or more lanes, this means that signals are abnormally received. Accordingly, in this case, the OTU3 DEMUX Deskew controller 94 determines that an error has generated in alignment of the lanes and may inform a user of the fact of the error generation.

According to an example, the transmission apparatus for 40G serial and parallel channel interworking may configure an OTU3 DEMUX RX interface unit 90 of FIG. 9, separately from the OTL3.4 RX interface unit 73 of FIG. 7. According to another example, the transmissions apparatus for 40G serial and parallel channel interworking may configure the OTU3 DEMUX RX interface unit 90 by changing the configuration of the OTL3.4 lane receivers 76 to the configuration of the OTU3 DEMUX lane receivers 92 of FIG. 9 and the configuration of the OTL3.4 deskew controller 78 to the configuration of the OTU3 DEMUX Deskew controller 94 of FIG. 9. That is, it is possible to change the function of the OTL3.4 RX interface unit 73 such that the OTL3.4 RX interface unit 73 detects OTU3 DEMUX patterns xA95, xFCO, xFEA, and xA80, instead of detecting and aligning frames with FAS patterns of frame signals.

Also, since a lane rotator is used in an OTL3.4 interface and not used in an OTU3 transmission method, the OTU3 DEMUX RX interface unit 90 needs no lane rotator and accordingly the example of FIG. 9 includes no lane rotator. However, as shown in FIG. 10 which will be described later, it is also possible to bypass a lane rotator using a lane rotator selector.

Also, the OTU3 DEMUX lane receivers 92 may sequentially detect the patterns of Xa95, xFCO, xFEA, and xA800, instead of detecting FAS patterns in the OTL3.4 lane receivers 76. At this time, since the OTU3 DEMUX lane receivers 92 do not simultaneously detect all the four patterns of xA95, xFCO, xFEA, and xA800, a more or less long time is taken to detect all the four patterns of xA95, xFCO, xFEA, and xA800. However, since patterns to be compared for each time period are corrected, the OTU3 DEMUX lane receivers 92 can be manufactured with a logic capacity that is smaller than that of a logic for sensing four patterns.

Figure 10:
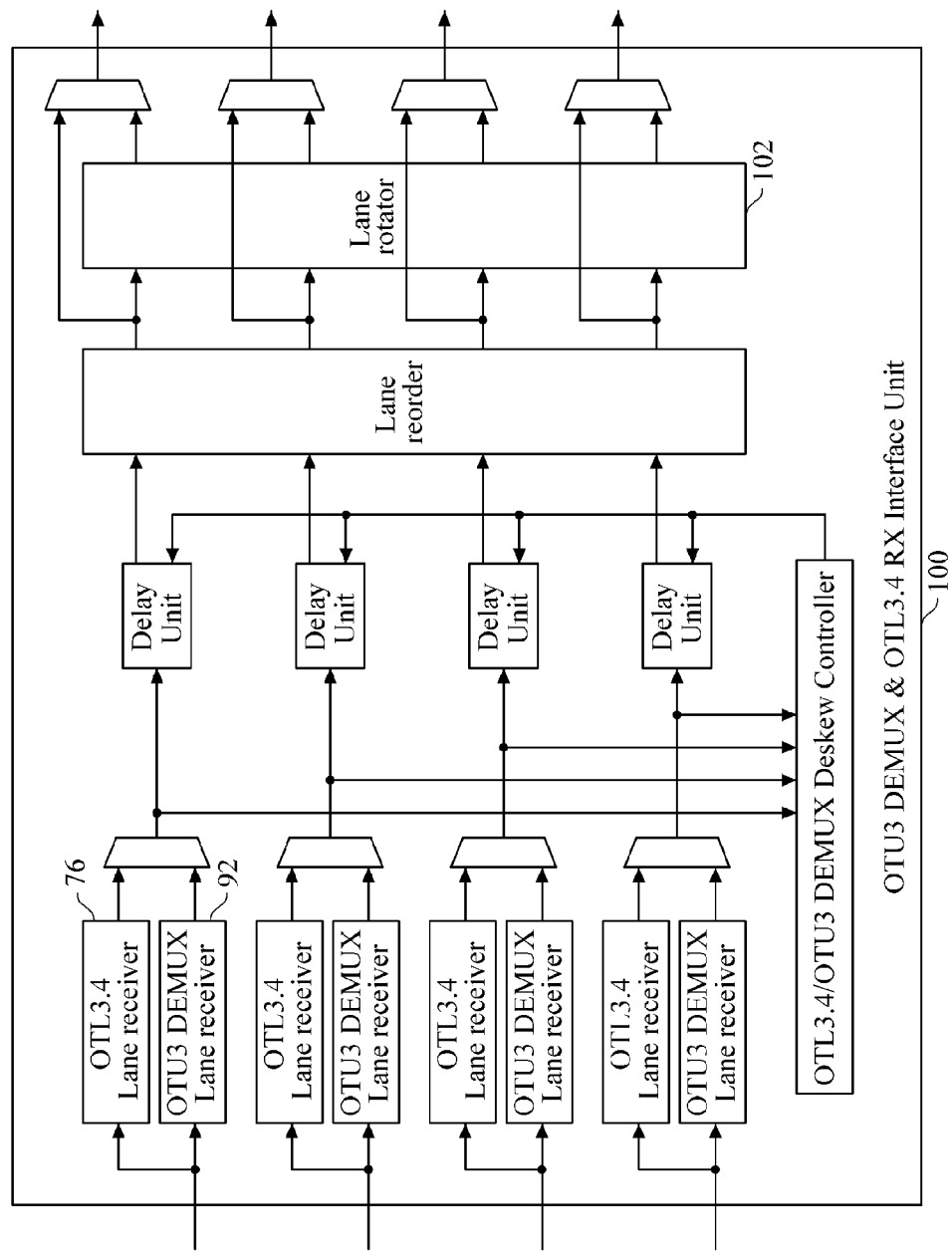
FIG. 10 is a diagram illustrating another configuration example of a receiver of a transmission apparatus for 40G serial and parallel channel interworking that does not support the SFI-5.2 interface.

FIG. 10 is a diagram illustrating another configuration example of receivers of a transmission apparatus for 40G serial and parallel channel interworking that does not support the SFI-5.2 interface.

Referring to FIG. 10, the receivers of the transmission apparatus for 40G serial and parallel channel interworking include an OTU3 DEMUX & OTL3.4 RX interface unit 100 including OTL3.4 lane receivers 76 and OTU3 DEMUX lane receivers 92. Also, additionally, the receivers include a RX lane rotator 102 to select one of an OTL3.4 RX interface function and an OTU3 DEMUX RX interface function through a bypass function.

As described above with reference to FIGS. 9 and 10, if a 40GBASE-FR optical module that does not support a SFI-5.2 interface receives a serial OTU3 signal from a 40G 300 pin MSA optical module, the 40GBASE-FR optical module 1:4 demultiplexes the serial OTU3 signal to generate four lane data signals, and if a transmission apparatus for 40G serial and parallel channel interworking receives the four demultiplexed lane data signals from the 40GBASE-FR optical module, the receivers of the transmission apparatus compensate for skews of the four lane data signals and aligns the resultant data signals to normally receive OTU3 signals.

However, it is impossible to provide signal comparability between the 40GBASE-FR optical module and the 40G 300 pin MSA optical module only through the receivers. That is, in order for the 40G 300 pin MSA optical module to receive OTU3 frame signals in the transmission order of OTU3 frames, as in the SFI-5.2 interface unit, it is necessary to compensate for skews generated between the 4:1 multiplexer of the 40GBASE-FR optical module and the transmitter of the transmission apparatus for 40G serial and parallel channel interworking.

Hereinafter, an example of a transmission apparatus for 40G serial and parallel channel interworking, which does not support the SFI-5.2 interface, to compensate for skews generated between a multiplexer and demultiplexer of the 40GBASE-FR optical module and a transceiver of the transmission apparatus will be described with reference to FIG. 11, below.

Figure 11:
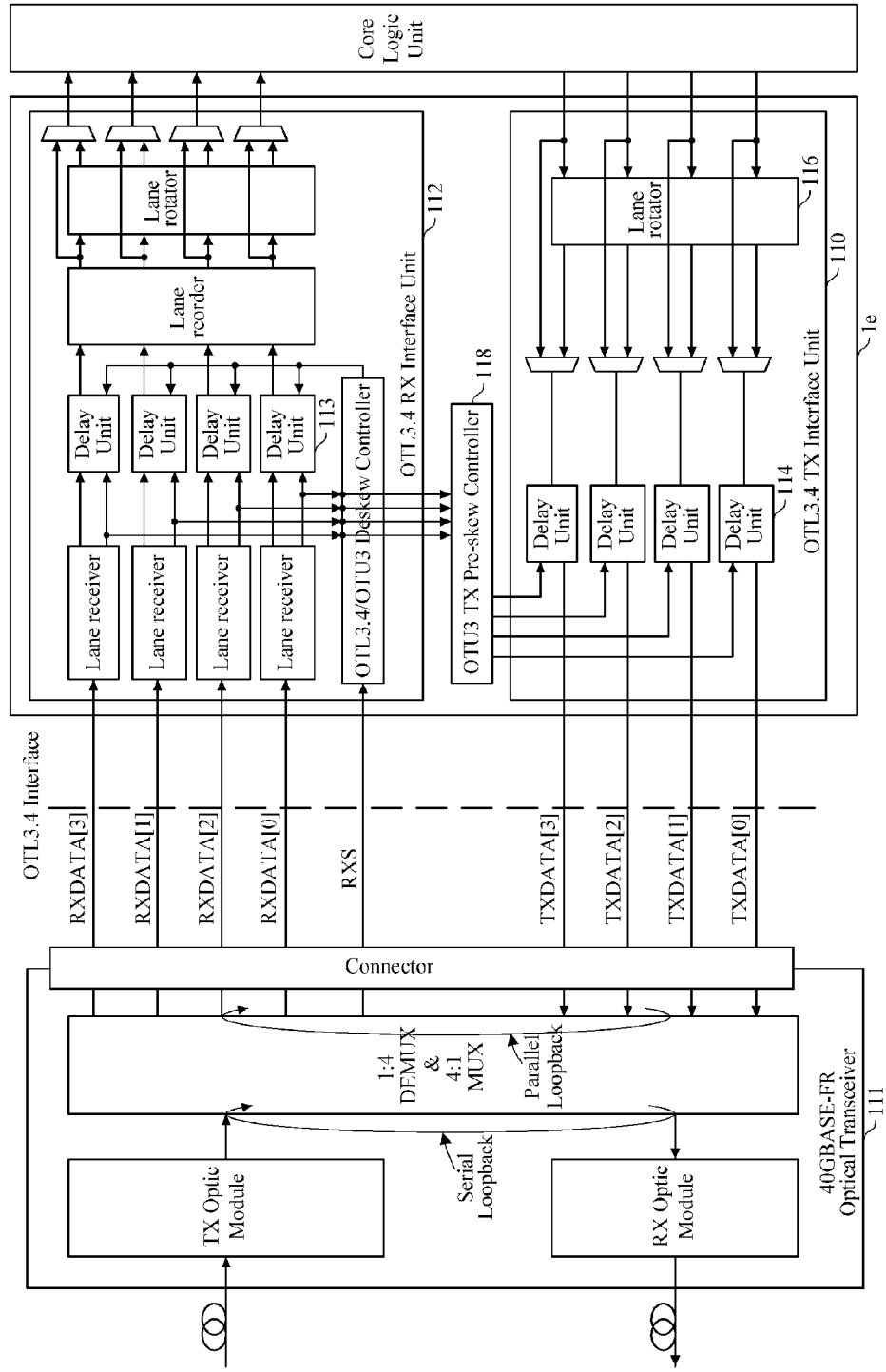
FIG. 11 is a diagram illustrating a configuration example of a transceiver of a transmission apparatus for 40G serial and parallel channel interworking that does not support the SFI-5.2 interface.

FIG. 11 is a diagram illustrating a configuration example of a transceiver of a transmission apparatus 1e for 40G serial and parallel channel interworking that does not support the SFI-5.2 interface.

Referring to FIG. 11, the transmission apparatus 1e for 40G serial and parallel channel interworking includes four TX delay units 114, a TX lane rotator 116, and an OTU3 TX pre-skew controller 118, in order to compensate for skews generated between a 4:1 multiplexer of a 40GBASE-FR optical module 111 and a transmitter 110 of the transmission apparatus 1e. The 40GBASE-FR optical module 111 may be, as illustrated in FIG. 11, configured with a chip such that the 4:1 multiplexer and a 1:4 demultiplexer can be looped back.

As described above with reference to FIG. 10, if the receivers of the transmission apparatus 1e receive OTU3 frame signals through a 1:4 DEMUX pattern alignment unit, it can be recognized that the OTU3 frame signals are signals received from a 40G 300 pin MSA optical module. Accordingly, the transmitter 110 of the transmission apparatus 1e is converted from an OTL3.4 mode to an OTU3 transmission mode.

When the transmitter 110 has been converted to an OTU3 reception and transmission mode, the 40GBASE-FR optical module 111 loops backs four data lane signals input to the 4:1 multiplexer of the 40GBASE-FR optical module, or loops back serial signals output after 4:1 multiplexing to the 1:4 demultiplexer. The 4:1 multiplexer and the 1:4 demultiplexer loop backs the four data lane signals in the direction of the transmission apparatus 1e for 40G serial and parallel channel interworking so that the transmission apparatus 1e can receive the four data lane signals which the transmission apparatus 1e has transmitted.

According to an example, if reception of OPU3 signals normally operates and the transmitter 110 is converted into the OTU3 signal transmission mode, the receiver 112 fixes the RX delay units 113 that have already compensated for skews to prevent skews from being again compensated for. In this case, since the 4:1 multiplexer and the 1:4 demultiplexer have looped backs signals, the receiver 112 again receives signals output from the transmitter 110, and skews of four data lanes between the 1:4 demultiplexer and the receiver 112 have been compensated for through the RX delay units 113.

However, since skews between four data lanes between the 1:4 multiplexer and the transmitter 110 of the 40GBASE-FR optical module 111 are not compensated for, if loop-back is performed, the receiver 112 can detect no signal due to skews between the data lanes. Accordingly, the receiver 112 operates the TX pre-skew controller 118 to adjust the TX delay units 114, while fixing the RX delay units 113.

That is, the amount of skews generated in the four lanes from the 1:4 demultiplexer to the transmission apparatus 1e for 40G serial and parallel channel interworking has been compensated for by the receiver 112, and the remaining amount of skews generated in the four lanes from the transmitter 110 to the 4:1 multiplexer can be compensated for by the TX pre-skew controller 118.

If skews are compensated for through the TX pre-skew controller 118 and transmission delay units 114 of the transmitter 110 and patterns are normally aligned, the loop-back of the 40GBASE-FR optical module 111 is released so that signals are normally transmitted to and received from the 40GBASE-FR optical module 111. Accordingly, since skews between the 4:1 multiplexer and the transmitter 110 of the 40GBASE-FR optical module 111 have been compensated for, signals output to the 40GBASE-FR optical module 111 have signal comparability with a 40G 300 pin MSA optical module.

Meanwhile, data is looped back and converted into data that is input to a transmission clock of the system, not to a reception clock that receives data, according to the characteristics of Giga transceivers used in the transmitter 110 and receiver 112 of the transmission apparatus 1e or according to the characteristics of Giga transceivers used in the multiplexer and demultiplexer of the 40GBASE-FR optical module 111, so that an amount of skews generated between the 1:4 demultiplexer and the receiver 112 of the 40GBASE-FR optical module 111 that will operate as a reception clock may have a difference from that of when it operates as a transmission clock. If such a difference is generated, skews generated between the 4:1 multiplexer and the transmitter 116 can be accurately compensated for, and accordingly operation for accurate skew compensation can be added. An apparatus for performing the operation for accurate skew compensation will be described with reference to FIG. 12, below.

Figure 12:
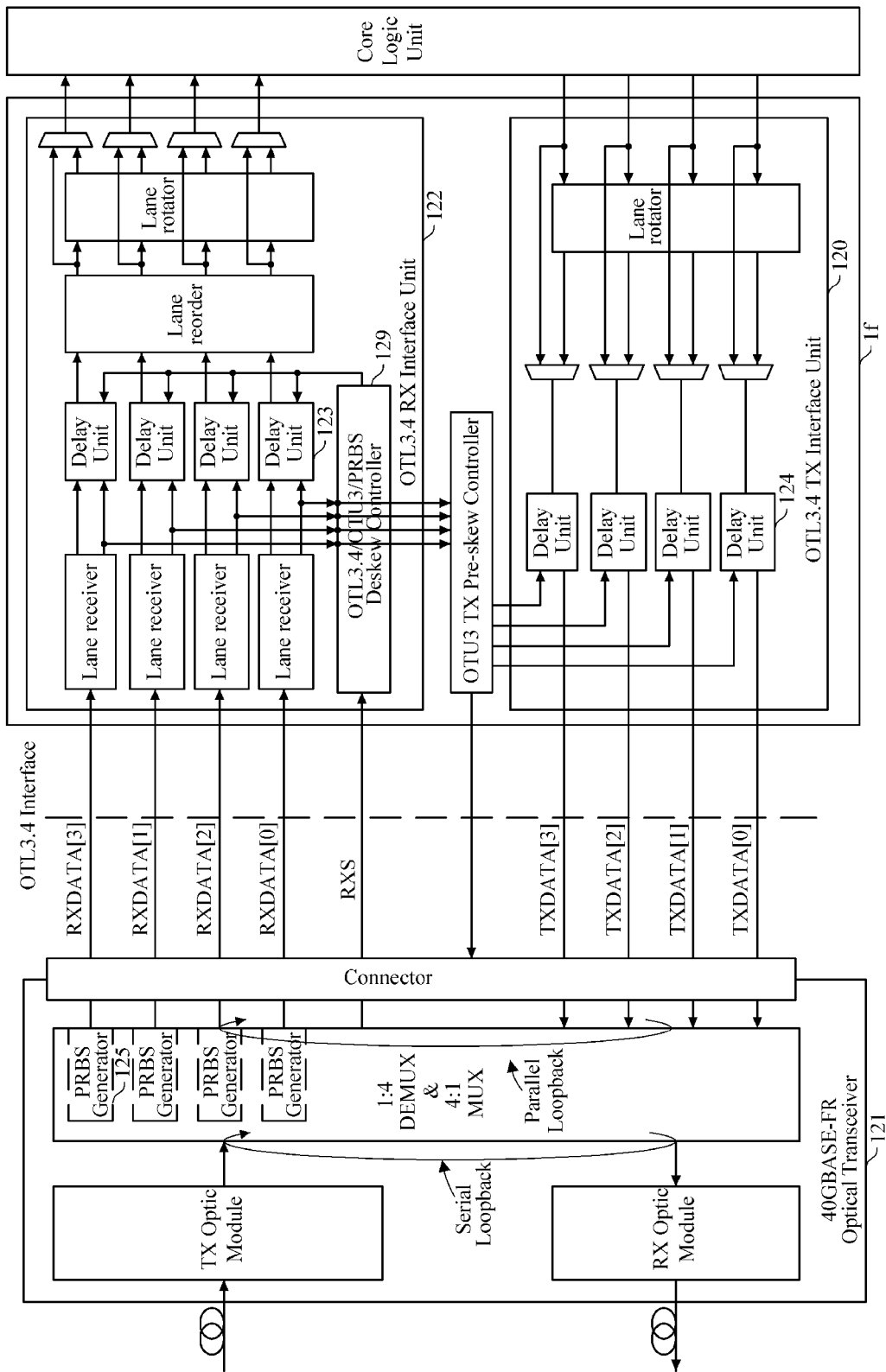
FIG. 12 is a diagram illustrating another configuration example of a transceiver of a transmission apparatus for 40G serial and parallel channel interworking that does not support the SFI-5.2 interface.

FIG. 12 is a diagram illustrating another configuration example of a transceiver of a transmission apparatus if for 40G serial and parallel channel interworking that does not support the SFI-5.2 interface.

Referring to FIG. 12, the transmission apparatus if uses a clock signal and RX data extracted from a 40G serial signal received from a 40GBASE-FR optical module 121 to compensate for skews generated between a receiver 122 and a 1:4 demultiplexer of the 40GBASE-FR optical module 122. Successively, the 40GBASE-FR optical module 121 generates a PRBS (PseudoRandom Binary Sequence) or an iterative pattern through a PRBS generator 125, and simultaneously outputs the PRBS and the iterative pattern to four lanes, using a transmission clock signal of the system, instead of a clock signal from a data signal received from the 1:4 demultiplexer.

Successively, the PRBS deskew controller 129 determines whether the PRBS or iterative pattern of the four lanes input according to the skew-compensated amount of skews has the same pattern at the same timing. If the PRBS or iterative pattern has the same pattern every clock, the PRBS deskew controller 129 determines that the skews have been compensated for regardless of RX and TX clock signals. Meanwhile, if the PRBS or iterative pattern that are received from the four lanes are not the same pattern, the PRBS deskew controller 129 adjusts the RX delay units 123 in a unit of bit to re-compensate for skews according to the changed amount of skews. By using the PRBS or iterative pattern created by the PRBS generator 125 through the above-described process, skews generated between the 1:4 demultiplexer and the receiver 122 of the transmission apparatus 1f for 40G serial and parallel channel interworking are compensated for.

Thereafter, by looping back four lane signals that are input to a 4:1 multiplexer through a transmission clock signal, again inputting the resultant lane signals to the transmission apparatus 1f, and then adjusting TX delay units 124 of the transmitter 120 of the transmission apparatus 1f, skews generated between the 4:1 multiplexer and the transmission apparatus 1f may be accurately compensated.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission apparatus for serial and parallel channel interworking, which supports signal comparability between a serial channel signal and a parallel channel signal in an optical transport network, the transmission apparatus comprising:
    a first receiving (RX) interface unit;
    a first transmitting (TX) interface unit;
    a second receiving (RX) interface unit; and
    a second transmitting (TX) interface unit;
    wherein the first RX interface unit and the first TX interface unit operate in a serial interface TX mode for channel interworking transmission between first serial optical modules supporting a SerDes Framer Interface (SFI) and process data signals and deskew signals that are transmitted in a transmission order of frames,
    wherein the second RX interface unit and the second TX interface unit operate in a parallel interface TX mode and process data signals that are transmitted through a plurality of data lanes for channel interworking transmission between second serial optical modules supporting no SFI or between parallel optical modules supporting no SFI.

2. The transmission apparatus of claim 1, wherein each of the first serial optical modules and the second serial modules is a 40GBASE-FR optical module and each of the first serial optical modules which supports the SFI-5.2 is further a 40G 300 pin MSA optical module, and
    each of the parallel optical modules which does not support the SFI is a 40GBASE-LR optical module.

3. The transmission apparatus of claim 1, wherein the serial interface TX mode of the first interface unit is a mode that supports serial channel signal transmission using a SFI-5, and
    the parallel interface TX mode of the second interface unit is a mode that supports parallel channel signal transmission using a plurality of parallel data lanes.

4. The transmission apparatus of claim 1, further comprising a decoding unit configured to monitor the serial interface TX mode of the first interface unit and the parallel interface TX mode of the second interface unit to thereby determine whether to activate the first interface unit or the second interface unit.

5. The transmission apparatus of claim 4, wherein the decoding unit automatically converts a transmission mode into one of the serial interface TX mode and the parallel interface TX mode according to a received input signal.

6. The transmission apparatus of claim 5, wherein the decoding unit activates, if receiving a Loss of Lane Alignment (LOL) alarm signal from the second RX interface unit, the first RX interface unit,
    the decoding unit deactivates, if receiving no RX Out-of-Alignment (RXOOA) alarm signal when the first RX interface unit is activated, the second RX interface unit, and
    the decoding unit deactivates, if receiving no LOL alarm signal from the second RX interface unit and receiving a RXOOA alarm signal from the first RX interface unit when the first RX interface unit is activated, the first RX interface unit and activates the second RX interface unit.

7. The transmission apparatus of claim 5, wherein the decoding unit activates, if receiving a LOL alarm signal from the second RX interface unit, the first RX interface unit or a RX deskew channel signal receiver in the first RX interface unit,
    the decoding unit activates, if receiving no Loss of Frame (LOF) alarm signal from the first RX interface unit or the RX deskew channel signal receiver in the first RX interface unit, the first RX interface unit, and
    the decoding unit activates, if receiving no RXOOA alarm signal from the first RX interface unit when the first RX interface unit is activated, the first TX interface unit and deactivates the second TX and RX interface units.

8. A transmission method for serial and parallel channel interworking of a transmission apparatus for serial and parallel channel interworking, the transmission apparatus supporting signal comparability between a serial channel signal and a parallel channel signal in an optical transport network, the transmission method comprising at least one operation of:
    processing data signals and deskew signals that are transmitted in a transmission order of frames, in a serial interface transmission mode, through a first transmitting interface unit and a receiving interface units for channel interworking transmission between serial optical modules that support a SerDes Framer Interface (SFI); and
    processing data signals transmitted through a plurality of data lanes, in a parallel interface transmission mode, through a second transmission interface unit and a reception interface unit for channel interworking transmission between the serial optical modules that do not support the SFI or between parallel optical modules that do not support the SFI.

9. The transmission method of claim 8, further comprising automatically converting a transmission mode into one of a serial interface transmission mode and a parallel interface transmission mode according to a received signal.

10. The transmission method of claim 9, wherein the automatically converting of the transmission mode into one of the serial and parallel interface transmission modes comprises:
    if a Loss of Lane Alignment (LOL) alarm signal is generated from the second receiving interface unit and no RX Out-of-Alignment (RXOOA) alarm signal is generated when the first receiving interface unit is activated, activating the first receiving interface unit, and deactivating the second receiving interface unit; and
    if no LOL alarm signal is generated from the second receiving interface unit and a RXOOA alarm signal is generated from the first receiving interface unit when the first receiving interface unit is activated, deactivating the first receiving interface unit, and activating the second receiving interface unit.

* * * * *